J. J. WEINANDT.
PRESSURE GAGE AUTOMOBILE WHEEL.
APPLICATION FILED JULY 6, 1916.
1,216,192.
Patented Feb. 13, 1917.
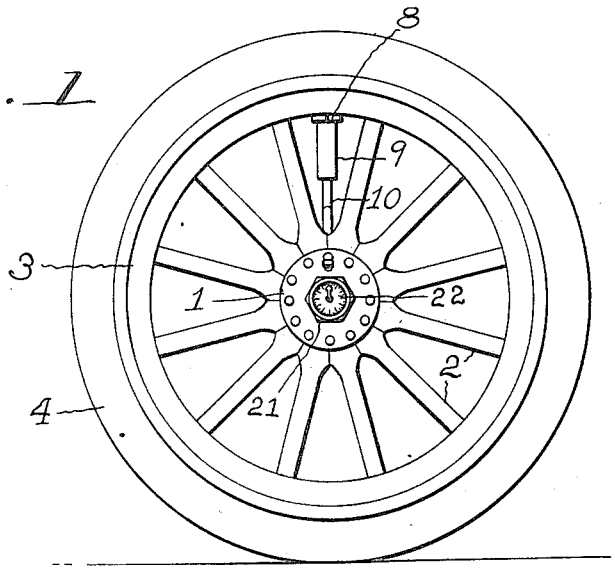
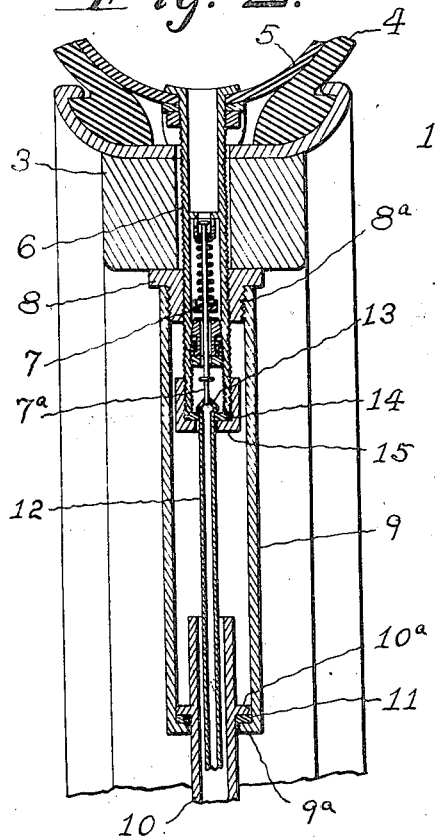
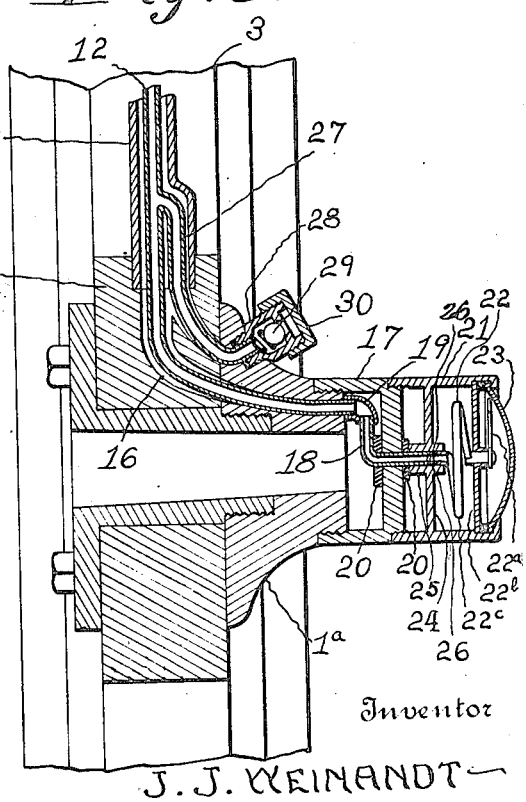
Inventor
J. J. WEINANDT
H. S. Hill  Attorney

UNITED STATES PATENT OFFICE.

JOSEPH JACOB WEINANDT, OF AYR, NORTH DAKOTA.

PRESSURE-GAGE AUTOMOBILE-WHEEL.

1,216,192. Specification of Letters Patent. Patented Feb. 13, 1917.

Application filed July 6, 1916. Serial No. 107,809.

*To all whom it may concern:*

Be it known that I, JOSEPH J. WEINANDT, a citizen of the United States, residing at Ayr, in the county of Cass, State of North Dakota, have invented a new and useful Pressure-Gage Automobile-Wheel; and I do hereby declare the following to be a full, clear, and exact description of the invention, such as will enable others skilled in the art to which it appertains to make and use the same.

The present invention relates to a pressure gage attachment for automobile wheels, and has for its object to provide a device of this character which embodies novel features of construction whereby it can be readily mounted upon any automobile wheel and will enable the air pressure within the tire to be determined at a glance without the necessity of unscrewing any parts and manually applying a pressure gage in the usual manner.

Further objects of the invention are to provide a device of this character which is comparatively simple and inexpensive in its construction, which can be used in connection with the standard makes of wheels and tires, which admits of the tire being readily removed and replaced in the usual manner, which indicates the pressure during the inflation of the tire so that there is no difficulty whatever in building up exactly the proper air pressure within the tire, and which has the gage mounted in such a manner that it is always visible and warns the motorist of under-inflation when the air pressure falls below the proper point.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a front elevation of an automobile wheel provided with a pressure gage constructed in accordance with the invention.

Fig. 2 is an enlarged sectional view through the rim of the wheel and the valve of the tire, together with associated parts of the pressure gage attachment, portions of the tire being also shown.

Fig. 3 is an enlarged sectional view through the hub of the wheel and associated parts of the pressure gage attachment, including the gage itself.

Corresponding and like parts are referred to in the following description and indicated in all the views of the drawing by the same reference characters.

For the purpose of illustration the invention is shown as applied to a conventional automobile wheel, including a hub 1, spokes 2, and rim 3. A tire shoe 4 is applied to the rim 3, and an inner tube 5 is arranged within the shoe 4, said inner tube being provided with the usual valve casing 6 within which the check valve 7 is mounted. The usual rim nut 8 is threaded upon the exterior of the valve casing 6, the threaded boss $8^a$ thereof which is ordinarily engaged by the dust-cap, being engaged by an outer tubular casing section 9 which telescopes upon an inner casing section 10, the two casing sections being arranged between a pair of the spokes 2 and extending radially from the hub 1 to the rim 3. The inner end of the outer telescoping casing section 9 is shown as provided with a flange $9^a$ which coöperates with a shoulder $10^a$ on the inner casing section 10 to limit the outward telescoping movement of the casing section 9. If desired, a washer member 11 may be interposed between the flange $9^a$ and the shoulder $10^a$.

Extending through the tubular casing members is an air-pipe 12, the outer end of the air pipe terminating in a projection 13 adapted to engage the stem $7^a$ of the check valve 7 to unseat the latter, and being also provided with a flange 14 which is adapted to be clamped tightly against the mouth of the air valve casing 6 by a cap 15, said cap having a central opening to receive the air-pipe 12, and being screwed upon the projecting end of the valve casing 6 in the same manner as the ordinary valve cap. The inner end of the air-pipe 12 extends through a curved opening 16 in the hub 1 of the wheel, being carried outwardly through the hub plate $1^a$ and projecting through the end thereof. A special hub-cap 17 is screwed upon the hub plate $1^a$, said hub cap having the usual hollow formation so that it can be packed with grease in the usual manner when applied to the front wheels which have roller bearings within the hubs thereof. An opening extends centrally through the hub cap 17, and one arm of an elbow shaped pipe 18 extends through this opening, the opposite arm of the said pipe 18 being connected by a suitable union 19 to the extremity of the air-pipe 12. Packing rings 20 are fitted upon the elbow shaped pipe 18 upon opposite sides of the hub cap 17 so as to bear tightly against the latter and prevent any possibility of the grease within the hub cap leaking out around the sides of the pipe 18.

A gage casing 21 is threaded upon the end of the hub cap 17 so as to provide in effect an extension thereof. Any suitable form of air pressure gage, such as the ordinary Bourdon gage 22, may be mounted within the casing 21, said gage including a pointer $22^a$ arranged to play over a scale $22^b$, both the pointer and scale being visible through a transparent plate 23 fitted within the end of the casing 21 and closing the same. A transverse partition 24 extends across the pressure gage casing 21 at a point spaced from the inner end thereof, the central portion of said partition being formed with a nipple 25 which receives the projecting end of the before mentioned elbow pipe 18, and bears against the packing ring or washer 20 so as to force the same tightly in position. The nipple 25 is axially disposed with respect to the pressure gage casing 21 so that the projection of the pipe 18 into the nipple does not interfere in any manner with screwing the gage casing in position upon the hub cap or removing it therefrom. When the gage casing is screwed home upon the hub cap, the extremity of the air pipe 18 is forced against a packing ring 26, thereby producing an air-tight joint between the pipe 18 and the spiral tube $22^c$ of the Bourdon gage. It will be remembered that the check valve 7 of the tire valve 6 is maintained in an open position by reason of the engagement of the projection 13 at the outer end of the air pipe 12 with the check valve stem $7^a$, and that the gage 22 is accordingly in uninterrupted communication with the interior of the tire. The air pressure within the tire is thus indicated at all times by the gage 22, and the gage is visible through the transparent end plate 23, so that the motorist can ascertain the exact pressure within the tire at a glance. This eliminates the necessity of unscrewing the caps from the tire valve casing and applying a detachable pressure gage to the air valve casing each time the air pressure is tested, and makes it very easy for the motorist to maintain the proper air pressure within the tire at all times.

An inflation pipe 27 branches from the air pipe 12 and leads through an opening in the hub of the wheel, having a suitable pump connection 28 applied to the extremity thereof. A suitable check valve 29 is shown as mounted within the pump connection, and a removable cap 30 normally closes the upper end of the pump connection. In order to inflate the tire, the cap 30 is removed and the union of the pump screwed upon the connecting member 28, or otherwise fitted upon the same. The air pressure within the tire may then be built up to the desired amount, the exact pressure being indicated at all times by the gage 22, so that there is no danger of getting too great a pressure or too small a pressure before disconnecting the pump. This eliminates the annoyance and inconvenience which is usually incident to disconnecting the pump for the purpose of applying the pressure gage to test the air pressure, it being necessary to again connect the pump if the desired pressure has not yet been reached. It is extremely important that the tire shall always be maintained under proper inflation, although this is frequently overlooked or neglected by motorists, owing principally to the fact that it requires a considerable amount of time to unscrew the caps from all of the tires and test the air pressure with a removable gage, and also to the fact that the parts to be unscrewed are always dusty and dirty, with the result that the hands are badly soiled in testing the air pressure. With the present construction the air pressure can always be determined at a glance without the necessity of unscrewing or removing any parts, and the tire can be easily inflated to the desired degree without the necessity of frequently breaking the pump connection to test the air pressure with a removable gage.

The device can be readily applied as an attachment to any ordinary automobile wheel, and it is used in connection with the standard tire valve casings, so that there is no necessity for any special equipment. The special hub cap 17 would be substituted for the ordinary hub cap, and the pressure gage casing 21 screwed in position upon the special hub cap. When it is necessary to change a tire, the outer tubular casing 9 is unscrewed from the rim nut 8 and telescoped upon the inner tubular casing 10, thereby exposing the cap 15 which can be unscrewed from the tire valve casing 6. The tire can then be removed in the usual manner and a new tire placed in position upon the wheel.

Having thus described the invention, what I claim as new and desire to secure by Letters Patent, is:—

1. In combination with an automobile wheel and a pneumatic tire, said tire being provided with the usual inflation valve, a hub cap applied to the wheel, an air pressure gage permanently mounted upon the hub cap, an air pipe leading to the pressure gage, means for detachably connecting the air pipe to the tire valve and unseating the tire valve, and a telescoping tubular casing inclosing the air pipe and extending radially from the hub to the rim of the wheel.

2. In combination with an automobile wheel and a pneumatic tire, said tire being provided with the usual inflation valve, a hub cap applied to the wheel, a pipe extending centrally through the hub cap and projecting therefrom, an air pipe leading from the inner end of the said pipe to the tire valve, means for detachably connecting the air pipe to the tire valve, a removable gage casing fitted upon the end of the hub cap and formed with a nipple which operatively engages the extremity of the pipe projecting centrally from the hub cap when the gage casing is fitted in position, and an air pressure gage mounted upon the gage casing.

3. In combination with an automobile wheel and pneumatic tire, said tire being provided with the usual inflation valve and the wheel having a hub plate, a hub cap fitted upon the hub plate, a pipe extending centrally through the hub cap, an air pipe leading from the said pipe to the tire valve casing, means for detachably connecting the air pipe to the tire valve casing and unseating the tire valve, an inflation pipe communicating with the air pipe and opening through the hub plate, a check valve for the inflation pipe, a gage casing fitted upon the end of the hub cap and formed with a nipple which operatively engages the extremity of the pipe extending from the center of the hub cap, and an air pressure gage mounted upon the gage casing.

4. In combination with an automobile wheel and pneumatic tire, said tire being provided with the usual inflation valve, and the hub having a hub plate, a hub cap applied to the hub plate, a pipe extending centrally through the end of the hub cap, an air pipe leading from the said pipe to the tire valve casing, means for detachably connecting the air pipe to the tire valve casing and unseating the tire valve, a gage casing fitted upon the end of the hub cap and formed with a nipple which operatively engages the extremity of the pipe projecting centrally from the hub cap, an air pressure gage mounted within the gage casing, an inflation pipe communicating with the air pipe and opening through the hub plate, a check valve for the inflation pipe, and a telescoping tubular casing inclosing the air pipe and extending radially from the hub to the rim of the wheel.

5. In combination with an automobile wheel and pneumatic tire, said tire being provided with the usual inflation valve and rim nut, a hub cap, an air pressure gage upon the hub cap, an air pipe leading from the air pressure gage of the hub cap to the tire valve casing, means for detachably connecting the air pipe to the tire valve casing and unseating the tire valve, and a tubular casing inclosing the air pipe and valve casing, said tubular casing being formed in telescoping members and the inner member being secured to the hub, while the outer member detachably engages the rim nut.

In testimony whereof I have signed my name to this specification in the presence of two subscribing witnesses.

JOSEPH JACOB WEINANDT.

Witnesses:
H. A. MALCH,
WM. McCOSH.